(12) United States Patent
van Oirschot et al.

(10) Patent No.: US 9,821,639 B2
(45) Date of Patent: *Nov. 21, 2017

(54) VEHICLE WITH A SLIDING DOOR SYSTEM

(71) Applicant: Ford Global Technologies, LLC, Dearborn, MI (US)

(72) Inventors: Dirk van Oirschot, Schwalmtal (DE); Olaf Van Leeuwen, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/976,345

(22) Filed: Dec. 21, 2015

(65) Prior Publication Data

US 2016/0101670 A1 Apr. 14, 2016

Related U.S. Application Data

(63) Continuation of application No. 14/115,988, filed as application No. PCT/EP2012/065932 on Aug. 15, 2012, now Pat. No. 9,254,731.

(30) Foreign Application Priority Data

Sep. 12, 2011 (DE) ........................ 10 2011 082 526

(51) Int. Cl.
*B60J 5/04* (2006.01)
*B60J 5/06* (2006.01)
*E05D 15/10* (2006.01)

(52) U.S. Cl.
CPC ........... *B60J 5/0458* (2013.01); *B60J 5/0456* (2013.01); *B60J 5/0461* (2013.01); *B60J 5/06* (2013.01);
(Continued)

(58) Field of Classification Search
CPC ...... B60J 5/0456; B60J 5/0458; B60J 5/0461; B60J 5/06; E05Y 2201/614; E05Y 2900/531; E05D 15/1047
(Continued)

(56) References Cited

U.S. PATENT DOCUMENTS 5,389,920 A    2/1995 DeLand et al.
6,401,396 B1 * 6/2002 Koban ...................... E05F 5/00
                                                              16/85
(Continued)

FOREIGN PATENT DOCUMENTS

EP    2329976 A1    11/2010
FR    2878553 A1    11/2004

*Primary Examiner* — Joseph D Pape
*Assistant Examiner* — Dana Ivey
(74) *Attorney, Agent, or Firm* — Jason Rogers; Price Heneveld LLP

(57) ABSTRACT

A vehicle having a sliding door arranged behind a body pillar, a frame around the door opening closeable by the sliding door, a rail system provided in the region of the sliding door connected fixedly to the vehicle and having upper and lower guide rails, sliding carriages provided on the sliding door connected to the sliding door via a respective supporting arm and guided displaceably on the guide rails, and side impact protection in the region of the sliding door. At least one of the sliding carriages or supporting arms is provided with a stop. In the event of a side impact, in which the outer vehicle wall is deformed in the direction of the vehicle interior, an abutment connected to the vehicle wall comes to bear against the stop of the sliding carriage or of the supporting arm, and the position of the sliding door is thereby blocked.

20 Claims, 4 Drawing Sheets

(52) U.S. Cl.
CPC .... *E05D 15/1047* (2013.01); *E05Y 2201/614* (2013.01); *E05Y 2900/531* (2013.01)

(58) Field of Classification Search
USPC .......................................... 296/155, 187.12
See application file for complete search history.

(56) References Cited

U.S. PATENT DOCUMENTS

| | | |
|---|---|---|
| 6,550,848 B2 | 4/2003 | Kleemann |
| 8,007,028 B2 | 8/2011 | Pencak et al. |
| 9,254,731 B2 * | 2/2016 | van Oirschot ......... B60J 5/0458 |
| 2010/0078961 A1 | 4/2010 | Takaya et al. |
| 2011/0131883 A1 | 6/2011 | Heuel et al. |

* cited by examiner

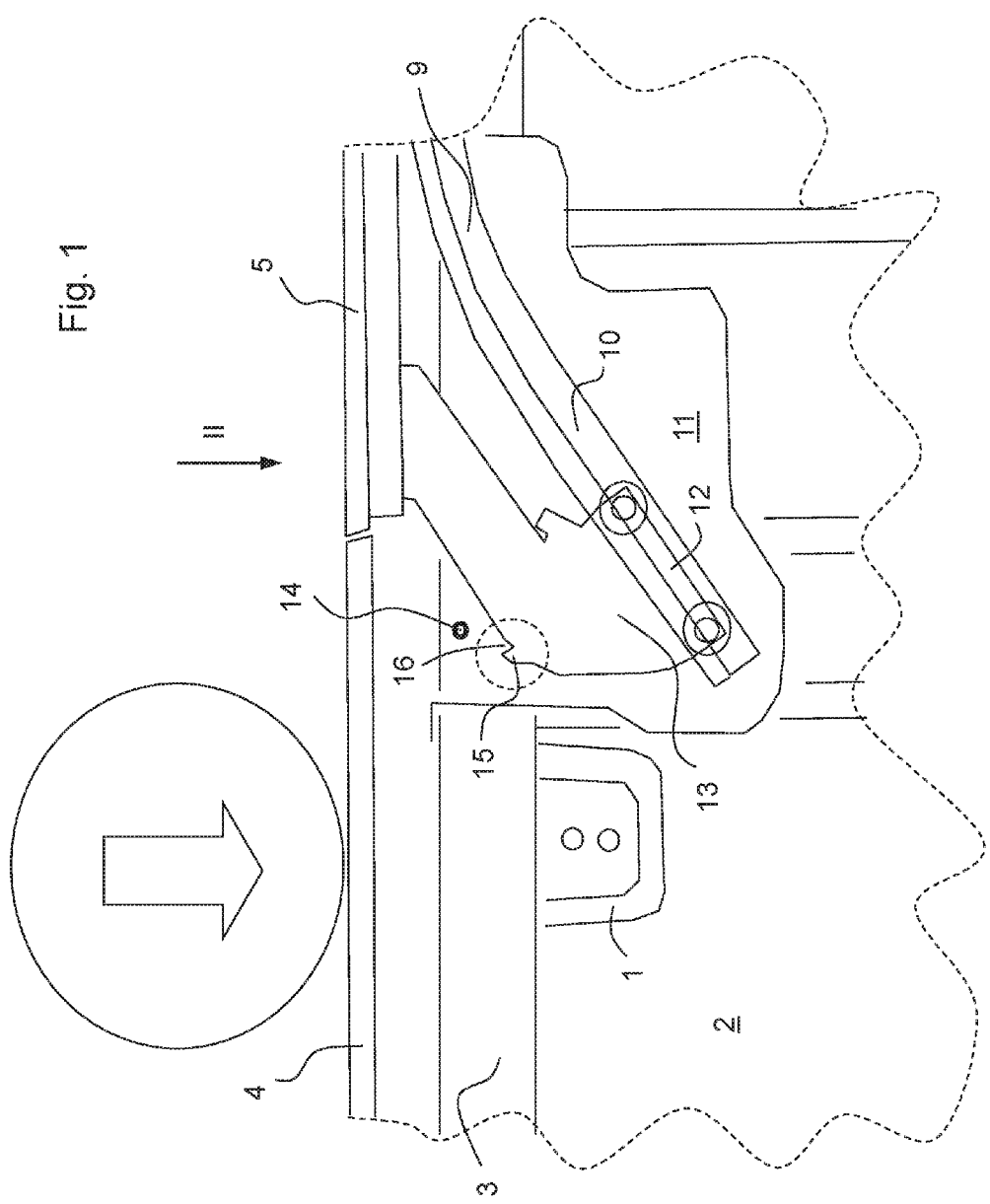

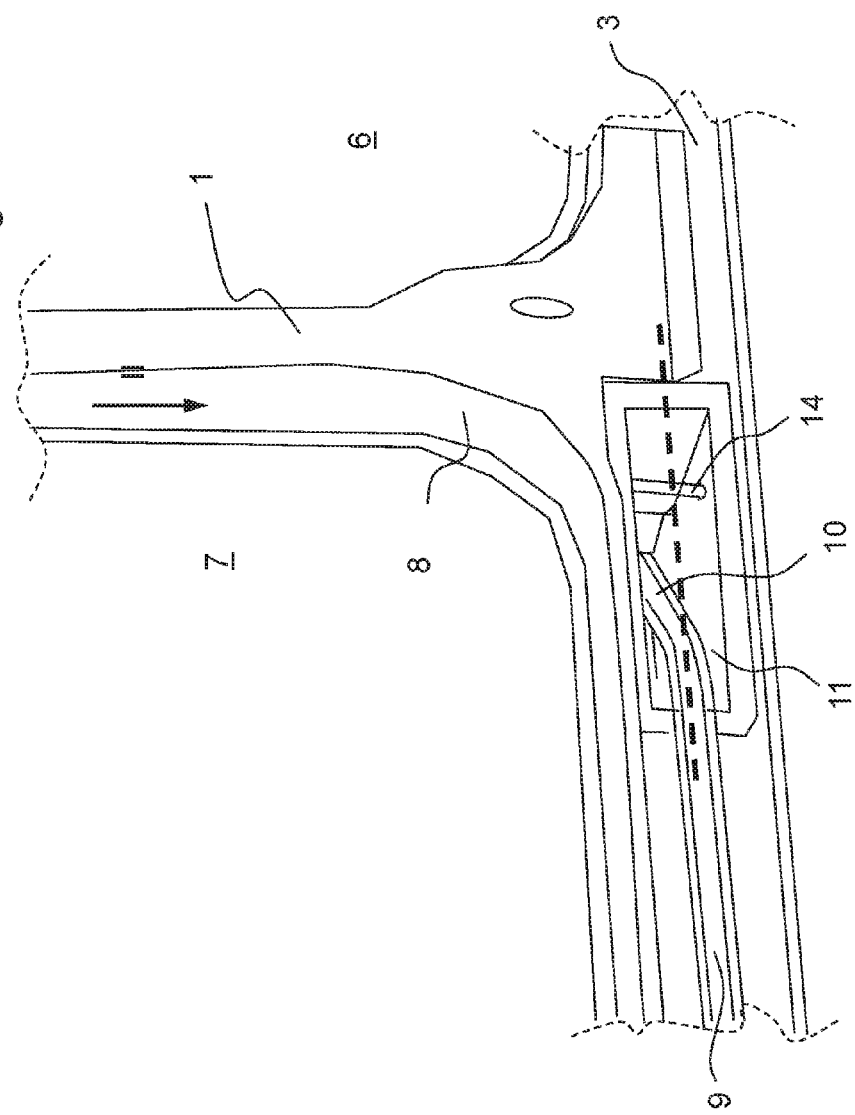

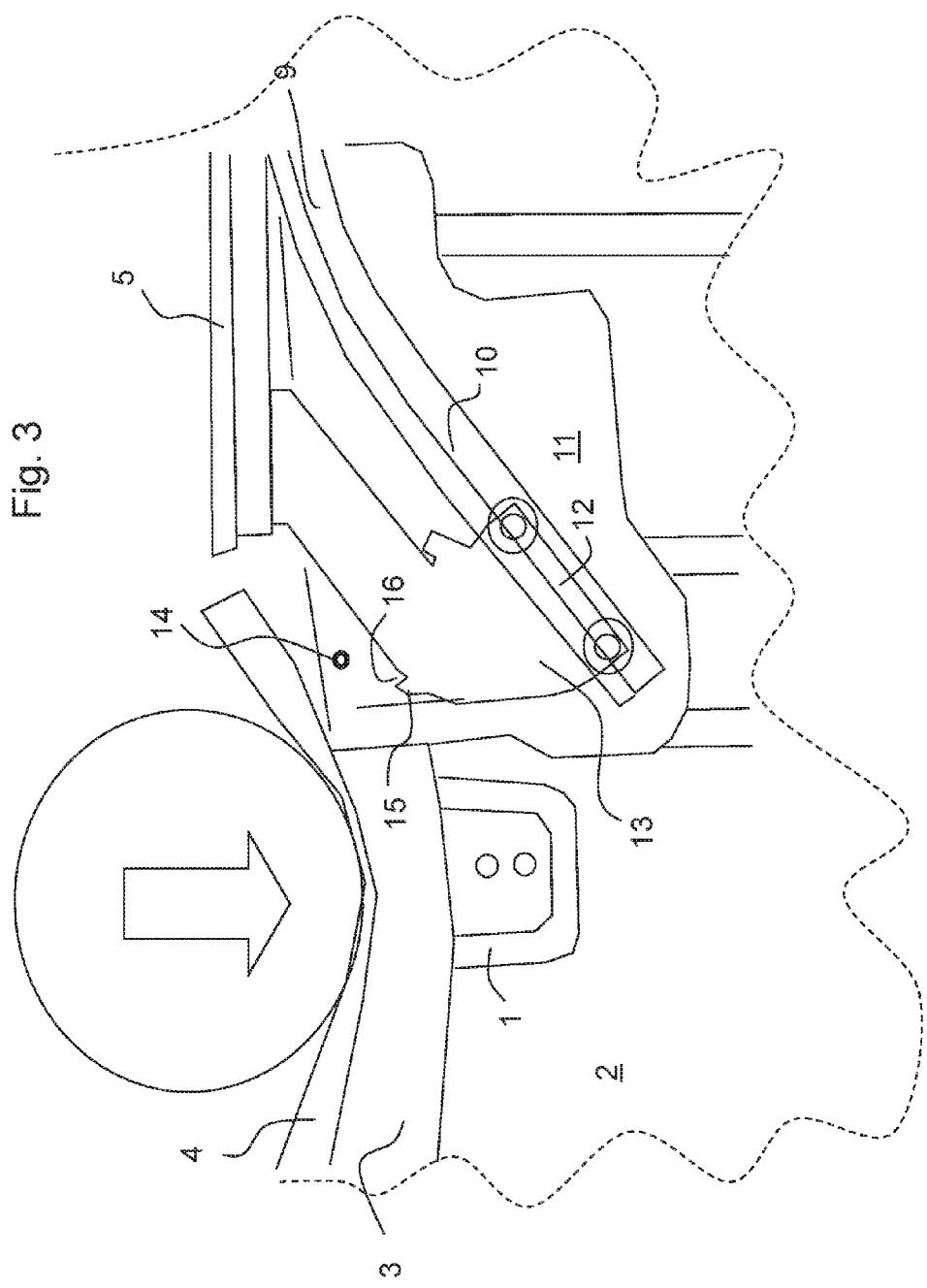

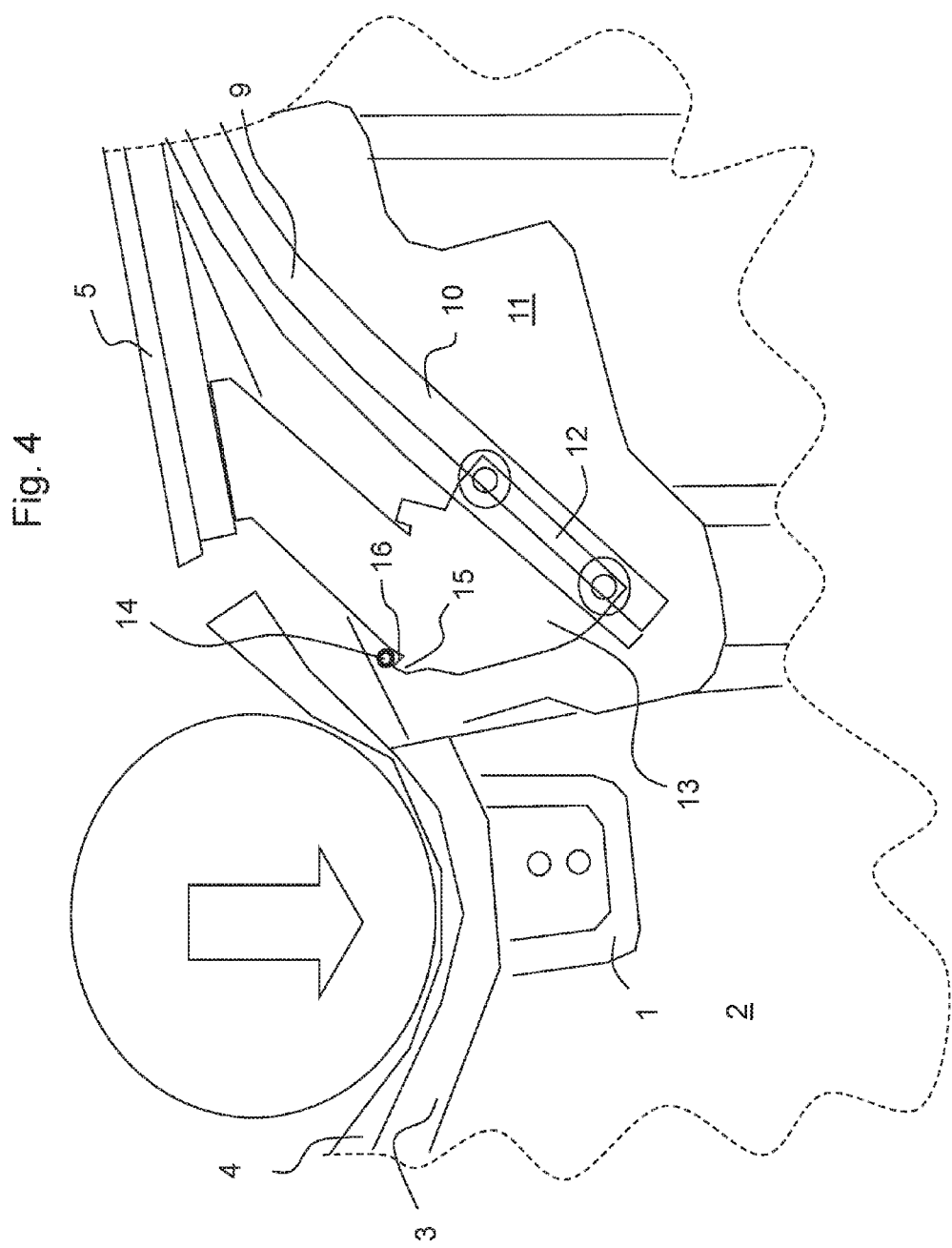

VEHICLE WITH A SLIDING DOOR SYSTEM

CROSS-REFERENCE TO RELATED APPLICATION

The present application is a continuation of U.S. patent application Ser. No. 14/115,988 filed Nov. 6, 2013, entitled VEHICLE WITH A SLIDING DOOR SYSTEM, which is a National Stage entry of PCT/EP2012/065932 filed Aug. 15, 2012, entitled VEHICLE WITH A SLIDING DOOR SYSTEM, which claims priority to German Application No. 102011082526.6 filed Sep. 12, 2011, the entire disclosures of which are hereby incorporated herein by reference.

FIELD OF THE INVENTION

The invention relates to a vehicle with at least one sliding door which is arranged behind a body pillar in the direction of travel, a frame running around the vehicle opening which can be closed by the sliding door, a rail system which is provided in the region of the sliding door, is fixedly connected to the vehicle and consists of an upper and a lower guide rail, sliding carriages which are provided on the sliding door, are connected to the respective sliding door via a respective supporting arm and are guided displaceably on the guide rails, and side impact protection in the region of the sliding door.

BACKGROUND OF THE INVENTION

Various systems are already known in vehicles as side impact protection. For example, special reinforcements of the body are provided, and in many cases side airbags are also fitted on the lateral inner walls of a vehicle.

In the case of vehicles with sliding doors, there is additionally the risk, in the event of a side impact, of the door springing out of its guide and even, under some circumstances, opening automatically, and therefore the vehicle occupants are additionally put at risk as a result.

In order, in the event of a side impact, to prevent the sliding door affected by the side impact from springing open, it is already known from EP 2 329 976 A1 to provide that side of the sliding door which can be opened with a centering means which secures the end of the door. The end surface of the centering means presses here against a spring-loaded bolt. Furthermore, the centering means is provided with a catch hook which is arranged at the front end of the centering means. The catch hook is directed inward in the longitudinal direction of the vehicle. When the sliding door is closed, a counterpart mounted on the body is opposite said catch hook. If, in the case of a side impact, the sliding door is deformed inward, the catch hook enters into contact with the counterpart mounted on the body, thus forming an anchoring means for the sliding door, said anchoring means resisting an inward deformation of the sliding door.

Such an anchoring means is not reliable, at least in the case of an extremely severe side impact, since, in the case of more severe deformation, the catch hook can easily be detached from the counterpart mounted on the body. In addition, this system does not prevent the sliding door from springing out of its guide and then carrying out uncontrolled movements, for example in the opening direction, which put the occupants of the vehicle at risk.

SUMMARY OF THE INVENTION

The invention is therefore based on the object of equipping a vehicle with a sliding door system which withstands even a severe side impact and ensures that the sliding door here is not detached from its guide and, in particular, does not automatically partially or completely open.

According to the invention, this object is achieved in that an abutment which is fixedly connected to the vehicle wall is provided approximately level with at least one sliding carriage as the side impact protection, in that at least one of the sliding carriages or supporting arms is provided with a stop, and in that, in the event of a side impact, in which the outer vehicle wall is deformed in the direction of the vehicle interior, the abutment which is connected to the vehicle wall comes to bear against the stop of the sliding carriage or of the supporting arm, and the position of the sliding door is thereby blocked.

The structure according to the invention protects the vehicle occupants in particular against the most frequently occurring side impact in the region of the front door or in the region of the central body pillar, what is referred to as the B-pillar. In this type of side impact, the guide carriages are very frequently pushed out of their guide, and therefore the sliding doors at least partially open. In the case of the structure according to the invention, this is very effectively prevented by the catch mechanism, in which, as the B-pillar is being pressed inward, the abutment which is provided in the region of the outer wall of the body gradually approaches the stop provided on the sliding carriage or the supporting arm and then comes to bear against said stop, as a result of which the sliding carriage is not only held fixedly in its guide, but its position is additionally fixed, and therefore the sliding door cannot move rearward into the open position.

The side impact protection according to the invention, consisting of the abutment and the stop, is preferably provided both for the upper and for the lower region of the sliding door. Frequently, however, even a corresponding securing means in the lower region of the door is sufficient by only the position of the lower sliding carriage being fixed in the case of a side impact.

Expediently, those regions of the guide rails that are located at the front in the direction of travel have angled ends running toward the center of the vehicle. Said angled ends of the guide rails preferably engage in lateral pockets which are provided on the vehicle body, run substantially horizontally and are arranged directly above the sill.

The stop provided on the respective sliding carriage or supporting arm can be designed as a catch hook which has a V-shaped receiving region.

Accordingly, the respective abutment can be designed as a pin which, in the event of a side impact, comes to bear against the stop.

The pin forming the abutment engages, in the case of a side impact, preferably in the V-shaped region of the stop, which is designed as a catch hook, and fixedly presses the sliding carriage against the inwardly bent end of the guide rail. At the same time, owing to the engagement of the pin in the V-shaped region of the catch hook, the sliding carriage is also prevented from being able to move into an open position of the door.

The pin forming the abutment has to be connected fixedly to the body parts. The pin here is preferably arranged between the sill and the frame surrounding the door opening and is connected stably to said parts.

BRIEF DESCRIPTION OF THE DRAWINGS

The invention is illustrated by way of example in the drawing and is described in detail below with reference to the drawing, in which:

FIG. 1 shows a top view of a horizontal section through a vehicle region around the central body pillar (B-pillar) with a front swinging door and a rear sliding door, FIG. 2 shows a side view of the vehicle detail in the direction of the arrow II according to FIG. 1, but with the doors having been omitted, FIG. 3 shows the same section as FIG. 1 in the event of slight deformation of the lateral body region due to a slight side impact, and FIG. 4 shows the same section as in FIGS. 1 and 3, but in the event of a more substantial deformation of the lateral body region due to a more severe side impact.

DETAILED DESCRIPTION OF THE PREFERRED EMBODIMENTS

The vehicle detail illustrated in FIG. 1 shows the region around a central body pillar 1 (B pillar) which extends substantially vertically upward from a base plate 2 and supports the vehicle roof (not illustrated in the drawing).

The lower region of the B-pillar 1 is directly adjacent to a sill 3 which forms the lateral end of the vehicle.

The rear section of a front swinging door 4 and the front part of a rear sliding door 5 are illustrated outside the sill 3.

In the view which is illustrated in FIG. 2 and in which the doors 4 and 5 have been omitted, only the door openings can be seen, specifically the door opening 6 of the front swinging door 4 and the door opening 7 of the rear sliding door 5.

The two door openings 6 and 7 are separated from each other by the B-pillar 1. The door opening 7, which can be closed by the rear sliding door 5, is also surrounded by a frame 8. As can furthermore be seen from FIGS. 1 and 2, a lower guide rail 9, the front region of which is provided with an angled end 10, is provided. The angled end 10 extends in a horizontal plane toward the center of the vehicle and engages, as can be seen in particular from FIG. 2, in a lateral pocket 11 of the vehicle. The pocket 11 is arranged between the sill 3 and the frame 8. A correspondingly designed guide rail can also be arranged in the upper region of the sliding door.

The area of the lateral pocket 11 and the angled end 10 of the lower guide rail 9, which end engages in the pocket 11, can be seen in FIG. 1.

As illustrated in particular in this figure, a sliding carriage 12 which is guided displaceably on the guide rail 9 is provided in order to guide the front end of the sliding door 5. The sliding carriage 12 is rigidly connected via an angled supporting arm 13 to that end of the sliding door 5 which is located at the front in the direction of travel.

The actual side impact protection, which is first and foremost essential in the present invention, consists of two essential parts, specifically, firstly, an abutment which is connected fixedly to the body parts and is in the form of a pin 14 and, secondly, a stop 15 which is formed on the supporting arm 13 and interacts with the pin 14 in the event of a side impact.

As can be seen in particular from FIG. 2, the pin 14 is arranged within the lateral pocket 11, specifically laterally outside the angled end 10 of the guide rail 9. The pin 14 is fixedly connected to the supporting parts which bound the lateral pocket 11, specifically preferably, firstly, to the sill 3 and, secondly, to the frame 8 surrounding the door opening 7 of the sliding door 5.

As can be seen in particular from FIG. 1, the stop 15 which interacts with the pin 14 and is arranged on the supporting arm 13 is designed as a catch hook which has a V-shaped receiving region 16 in which the pin 14 engages in the event of a severe side impact.

FIGS. 3 and 4 illustrate the simulation of a side impact.

First of all, a slight deformation of the front swinging door 4 and of the body parts located therebehind, in particular the B-pillar, is illustrated according to FIG. 3. At this degree of deformation which corresponds approximately to a deformation of 80 mm, the rear sliding door 5, including the guide rail 9, and also the sliding carriage 12 and the supporting arm 13, is still substantially intact. However, in this state of deformation, the pin 14 has already come somewhat closer to the stop 15 provided on the supporting arm 13. With this degree of deformation, there is not yet any risk of the sliding door 5 inadvertently springing open.

Only as deformation progresses, as illustrated in FIG. 4, by approx. 150 mm do the rear sliding door 5 and the guide rail 9 also undergo considerable deformation such that there is the risk of the sliding carriage 12 springing out of the guide rail 9 and the sliding door 5 opening.

As can be seen from FIG. 4, in the event of this degree of deformation, the pin 14 is mounted onto the stop 15 of the supporting arm 13 and is securely held in the V-shaped receiving region 16 of the stop 15.

In this configuration, although the pin 14 presses the supporting arm 13 and therefore the sliding carriage 12 for a distance in the direction of the interior of the vehicle, it is ensured in this configuration that the sliding carriage 12 is not detached from the guide rail 9. Furthermore, the engagement of the rigid pin 14 in the V-shaped receiving region 16 of the pin 15 causes the door to be automatically blocked and no longer able to move in the opening direction.

Consequently, two very important effects are achieved by this newly developed protective measure, namely, firstly, the securing of the sliding carriage on the guide rail 9 such that the sliding door 5 cannot spring open and, secondly, blocking of the door in the opening direction.

This very important and reliable effect is achieved with extremely simple means which only negligibly increase the production costs of the vehicle.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
   a vehicle wall having an abutment and defining a door opening;
   a sliding carriage and supporting arm that guide a sliding door on a rail system; and
   a V-shaped stop on one of the sliding carriage and supporting arm to engage the abutment when the vehicle wall deforms during a side impact, wherein the sliding door is inoperable when the abutment is received in the V-shaped stop.

2. The vehicle of claim 1, wherein in an absence of deformation of the vehicle wall, the V-shaped stop is positioned at least approximately 80 millimeters from the abutment.

3. The vehicle of claim 1, wherein in an absence of deformation of the vehicle wall, the V-shaped stop is positioned at least approximately 150 millimeters from the abutment.

4. The vehicle of claim 1, wherein engagement of the abutment and the V-shaped stop substantially maintains engagement between the sliding carriage and the rail system.

5. The vehicle of claim 1, wherein the abutment is arranged approximately in the same horizontal plane with the sliding carriage and at least one guide rail of the rail system.

6. The vehicle of claim 1, wherein guide rails of the rail system proximate a body pillar include angled ends running toward a center of the vehicle.

7. The vehicle of claim 6, wherein the angled ends of the guide rails engage in lateral pockets of the vehicle.

8. The vehicle of claim 1, wherein the abutment is a pin, wherein during the side impact, the pin moves toward the V-shaped stop.

9. The vehicle of claim 8, wherein the pin defined by the abutment is arranged between a sill and a frame surrounding the door opening of the sliding door and is connected stably to the sill and the frame.

10. A vehicle comprising:
a frame;
a guide rail;
a sliding door comprising a stop having a V-shaped receiving region, wherein the sliding door is guided on the guide rail between open and closed positions; and
an abutment provided proximate the frame, wherein during a side impact condition, a vehicle wall is deformed towards a center of the vehicle such that the V-shaped receiving region engages the abutment, wherein engagement of the V-shaped receiving region and the abutment secures the sliding door in an inoperably closed position and free of sliding operation on the guide rail, and wherein the sliding door is operable along a rail system when the abutment is free of engagement with the V-shaped receiving region, and wherein in the absence of deformation of the vehicle wall the closed position of the sliding door is characterized by the V-shaped receiving region being set apart from the abutment.

11. The vehicle of claim 10, wherein the stop is disposed on one of a sliding carriage and a support arm of the sliding door, wherein the sliding carriage guides the sliding door on the guide rail.

12. The vehicle of claim 11, wherein engagement of the abutment and the V-shaped receiving region substantially maintains engagement between the sliding carriage and the guide rail during the side impact condition.

13. The vehicle of claim 11, wherein the abutment is arranged approximately in the same horizontal plane with the sliding carriage and the guide rail.

14. The vehicle of claim 10, wherein in an absence of deformation of the vehicle wall the V-shaped receiving region is positioned approximately 80 millimeters from the abutment.

15. The vehicle of claim 10, wherein in an absence of deformation of the vehicle wall the V-shaped receiving region is positioned approximately 150 millimeters from the abutment.

16. The vehicle of claim 10, wherein the guide rail includes an angled end extending inward toward the center of the vehicle.

17. The vehicle of claim 10, wherein the abutment is a pin, wherein during the side impact condition, the pin moves toward the V-shaped receiving region.

18. The vehicle of claim 17, wherein the pin defined by the abutment is arranged between a sill and the frame surrounding a door opening of the sliding door, wherein the pin is fixedly connected to the sill and the frame.

19. A vehicle comprising:
a vehicle wall having an abutment;
a sliding carriage having a support arm, wherein the sliding carriage guides a sliding door on a rail system; and
a V-shaped catch on the sliding carriage to engage the abutment when the vehicle wall deforms during a side impact, wherein the sliding door is inoperable when the abutment is received in the V-shaped catch.

20. The vehicle of claim 19, wherein the abutment is arranged approximately in the same horizontal plane with a guide rail of the rail system and the sliding carriage.

* * * * *